(12) United States Patent
Habdank et al.

(10) Patent No.: US 9,175,879 B2
(45) Date of Patent: Nov. 3, 2015

(54) FASTENING SYSTEM FOR FASTENING SOLAR MODULES

(75) Inventors: Martin Habdank, Heiningen (DE); Peter Habdank, Heiningen (DE); Ralf Baumann, Wernau (DE)

(73) Assignee: Habdank PV-Montagesysteme GMBH & Co. KG, Goeppingen (DE)

( * ) Notice: Subject to any disclaimer, the term of this patent is extended or adjusted under 35 U.S.C. 154(b) by 0 days.

(21) Appl. No.: 14/123,705

(22) PCT Filed: May 22, 2012

(86) PCT No.: PCT/EP2012/059474
§ 371 (c)(1),
(2), (4) Date: Feb. 5, 2014

(87) PCT Pub. No.: WO2012/163728
PCT Pub. Date: Dec. 6, 2012

(65) Prior Publication Data
US 2014/0137489 A1    May 22, 2014

(30) Foreign Application Priority Data

Jun. 3, 2011  (DE) .......................... 10 2011 105 852
Jul. 26, 2011  (DE) .......................... 10 2011 052 129

(51) Int. Cl.
*F24J 2/52*   (2006.01)
*F24J 2/00*   (2014.01)

(52) U.S. Cl.
CPC .............. *F24J 2/5245* (2013.01); *F24J 2/5207* (2013.01); *F24J 2/5249* (2013.01); *F24J 2/5258* (2013.01);
(Continued)

(58) Field of Classification Search
CPC ....... F24J 2/5245; F24J 2/5207; F24J 2/5249; F24J 2/5258

USPC ........... 52/173.3; 126/623, 680; 136/244, 246
See application file for complete search history.

(56) References Cited

U.S. PATENT DOCUMENTS

2003/0070368 A1* 4/2003 Shingleton .................... 52/173.3
2004/0163338 A1* 8/2004 Liebendorfer ............... 52/173.1
(Continued)

FOREIGN PATENT DOCUMENTS

AU  2009245849 A1  6/2010
DE     8418908 U1  9/1984
(Continued)

OTHER PUBLICATIONS

International Search Report of PCT/EP2012/059474 Dated Oct. 5, 2012 With an English Translation.

*Primary Examiner* — Brian Glessner
*Assistant Examiner* — Adam Barlow
(74) *Attorney, Agent, or Firm* — Venable LLP; Robert Kinberg (57) ABSTRACT

A fastening system including a plurality of fastening modules to mount a solar module having a first longitudinal direction on a roof structure or a façade having a second longitudinal direction. Each fastening module comprises one module carrier mountable on the roof structure or on the façade; a slide block guidable inside the module carrier; a module clamp; and a fastener to connect the module clamp to the slide block to clamp a respective solar module between the module clamp and the slide block. The module clamp is rotatable between two positions on the fastener so that an arrangement of the fastening modules permits the solar module to be mounted on the roof structure or the façade with the first longitudinal axis perpendicular or parallel to the second direction.

10 Claims, 7 Drawing Sheets

(52) U.S. Cl.
CPC ........ *F24J 2/5264* (2013.01); *F24J 2002/0038* (2013.01); *F24J 2002/5288* (2013.01); *Y02B 10/20* (2013.01); *Y02E 10/47* (2013.01)

(56) References Cited

U.S. PATENT DOCUMENTS

2007/0295391 A1* 12/2007 Lenox et al. ................... 136/251
2013/0299656 A1* 11/2013 Kemmer et al. ......... 248/231.85

FOREIGN PATENT DOCUMENTS

| | | | |
|---|---|---|---|
| DE | 202010007741 | U1 | 8/2010 |
| DE | 202010007139 | U1 | 9/2010 |
| DE | 202010010969 | U1 | 10/2010 |
| DE | 202010011235 | U1 | 10/2010 |
| DE | 202010011235 | * | 11/2010 ................ F16B 5/06 |
| EP | 2105971 | A1 | 9/2009 |
| EP | 2149648 | A1 | 2/2010 |
| FR | 2935410 | A1 | 3/2010 |
| FR | 2950375 | A1 * | 3/2011 |
| FR | 2950375 | A1 | 3/2011 |
| JP | 2010163750 | A | 7/2010 |
| WO | WO-2010019742 | A2 | 2/2010 |
| WO | WO-2010140878 | A2 | 12/2010 |

* cited by examiner

FASTENING SYSTEM FOR FASTENING SOLAR MODULES

CROSS-REFERENCE TO RELATED APPLICATIONS

This application is a U.S. National Stage of International Application No. PCT/EP2012/059474, filed May 22, 2012, claiming priority to German Application Nos. DE 10 2011 105 852.8, filed Dec. 3, 2011 and DE 10 2011 052 129.1, filed Jul. 26, 2011.

BACKGROUND

The invention relates to a fastening system for fastening solar modules.

Fastening systems of this type are used as mounting systems and support structures for solar modules, in particular photovoltaic modules, which are components of solar systems. The fastening systems in question are generally used for the fastening of solar modules on a roof structure, in particular a roof embodied as trapezoid metal roof. The roof structure can alternatively also be embodied as a corrugated metal roof. Furthermore conceivable are roof structures in the form of sandwich-type roofs and the like. Finally, the fastening systems according to the invention can also be used on facades.

Roof structures of this type, in particular trapezoid metal roofs, always have a specific pitch or inclination, so that accordingly the solar modules on a roof structure of this type are also positioned with an inclination. Corresponding to the different orientation of the solar modules with respect to this direction of inclination, the solar modules can be mounted with their longitudinal axis aligned with the angle of inclination or transverse to the angle of inclination on the roof structure, wherein a roof structure taking the form of a trapezoid metal roof itself consists of an alternating arrangement of high beads and low beads for which the longitudinal axes extend in the direction of pitch for the trapezoid metal roof.

Solar module fastening systems known from the prior art require the use of rail sections which are mounted on the high beads of the trapezoid metal roof. These systems have the disadvantage that the fastening systems installed with their length aligned with the pitch direction and those installed with their length aligned transverse to the pitch direction must be embodied differently. As opposed to the installation aligned with the pitch direction, the installation aligned transverse to the pitch direction requires additional support rails, profile designs, and the like, thus resulting in an undesirably high construction and cost expenditure for the fastening system.

SUMMARY OF THE INVENTION

An object of the invention is to provide a fastening system of the aforementioned type which makes it possible to mount solar modules in different arrangements on a roof structure or on a facade, at the lowest possible cost and expenditure.

The fastening system according to the invention is used for fastening solar modules on a roof structure or on a facade and comprises an arrangement of fastening modules. The fastening modules, as components of an installation kit, respectively comprise a module carrier which can be mounted on the roof structure or on the facade, as well as a slide block that is guided inside the module carrier and is connected with the aid of a fastening means to a module clamp. The respective solar module can be clamped in with the aid of this clamp. Given the same orientation for the module carrier mounted on the roof structure or on the facade, the module clamp on the fastening means can be rotated between two positions of rotation, so that mounting of the solar modules with their length aligned with the pitch direction or transverse to the pitch direction is possible.

For a mounting of a solar module with their length aligned transverse to the pitch direction on a roof structure with pitch, or on a facade, it is particularly advantageous to arrange the fastening modules on the lower and upper edge of the solar module. For an installation of a solar module with the length aligned with the pitch direction on a roof structure with pitch or on a facade, the fastening modules are arranged on the side edges of the solar module.

For the mounting in alignment with the pitch direction, the module clamp and the spacer element are rotated by 90°, as compared to the position for the mounting transverse to the pitch direction.

The fastening system which consists solely of fastening modules can be used universally and permits a structurally simple and cost-effective fastening of solar modules since alignment with the pitch direction or transverse to the pitch direction of solar modules on a roof structure or on a facade can be realized without problem, using the same fastening modules and without requiring additional components.

This advantage is further reinforced in that the individual fastening modules consist only of a small number of individual components which can furthermore be assembled easily and quickly to form a fastening module.

A further advantage of the invention is that the components of a fastening module are provided in the form a kit, wherein this allows the fastening of different solar modules since the fastening module kits contain differently designed components.

As a further component of a fastening module, a spacer element is advantageously provided which can be rotated along with the fastening means and the module clamp. Using spacer elements of different lengths makes it possible to adapt to solar modules having different structural heights.

With the fastening systems according to the invention, solar modules can generally be mounted on different roof structures or facades. Without restricting the general applicability, we refer in the following to a roof structure in the form of a trapezoid metal roof.

It is particularly advantageous if the module carrier is fastened on two successively following high beads of a trapezoid metal roof. The module carrier comprises a rail-type holding fixture in which the slide block is positioned so as to be displaceable. The slide block is connected with the aid of a screw to the module clamp.

The module carrier is thus optimally adapted to the design and construction of the trapezoid metal roof and has a short length since it only rests on two successive high beads. The slide block can be positioned easily and in a suitable manner inside the module carrier, so that it can accommodate the module clamp in its desired position on the solar module. One essential advantage of the invention is that with a fixed arrangement of the module carrier on the high beads of the trapezoid roof, a mounting aligned with the pitch as well as a mounting transverse to the pitch direction of solar modules can be realized simply by rotating components of the fastening modules, in particular the module clamp positioned on the fastening means and, if applicable, also the spacer element.

According to a first variant, a framed solar module is fastened on the roof structure or on the facade, wherein the module clamp of a fastening module fits only against the top side of the solar module. The bottom side of the solar module rests on a support surface of the respective module carrier.

In that case, the slide block or the module clamp of a fastening module arranged at the lower edge of the solar module functions as anti-slip protection for the solar module.

As a result, an additional safeguard for the solar module is obtained.

Essential in this case is that the slide block projects over the top of the module carrier.

The part of the slide block which projects over the module carrier can thus form an end stop for the solar module and can therefore also function as anti-slip protection.

Alternatively, the fastening system according to the invention can also be used to mount a non-framed solar module on the trapezoid metal roof, wherein the module clamp of a fastening module fits against the top and bottom sides of the solar module.

Since the module clamps in that case come in direct contact with the limit surfaces of the solar module, which are composed of glass laminate, the module clamp is designed to have an upper part and a lower part which is respectively provided with one elastic element that fits against the solar module for the protection of those surfaces.

The invention is explained in the following with the aid of the drawings, which show in:

BRIEF DESCRIPTION OF THE DRAWINGS

FIG. 3b: A sectional view of the arrangement according to FIG. 3a;

FIG. 4b: A sectional view of the arrangement according got FIG. 4a;

DETAILED DESCRIPTION

Figure 1A:
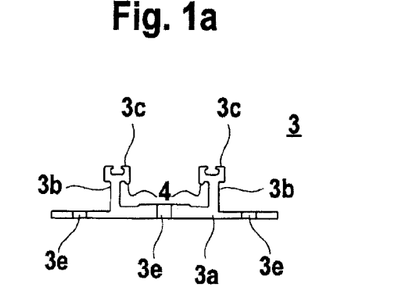
FIGS. 1a-1c: A first embodiment of components of a fastening module for a fastening system, used to fasten solar modules on a trapezoid metal roof.
Figure 1B:
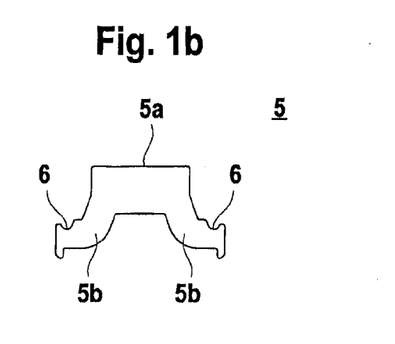
Figure 1C:
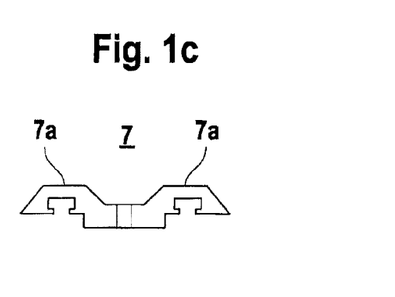
Figure 3A:
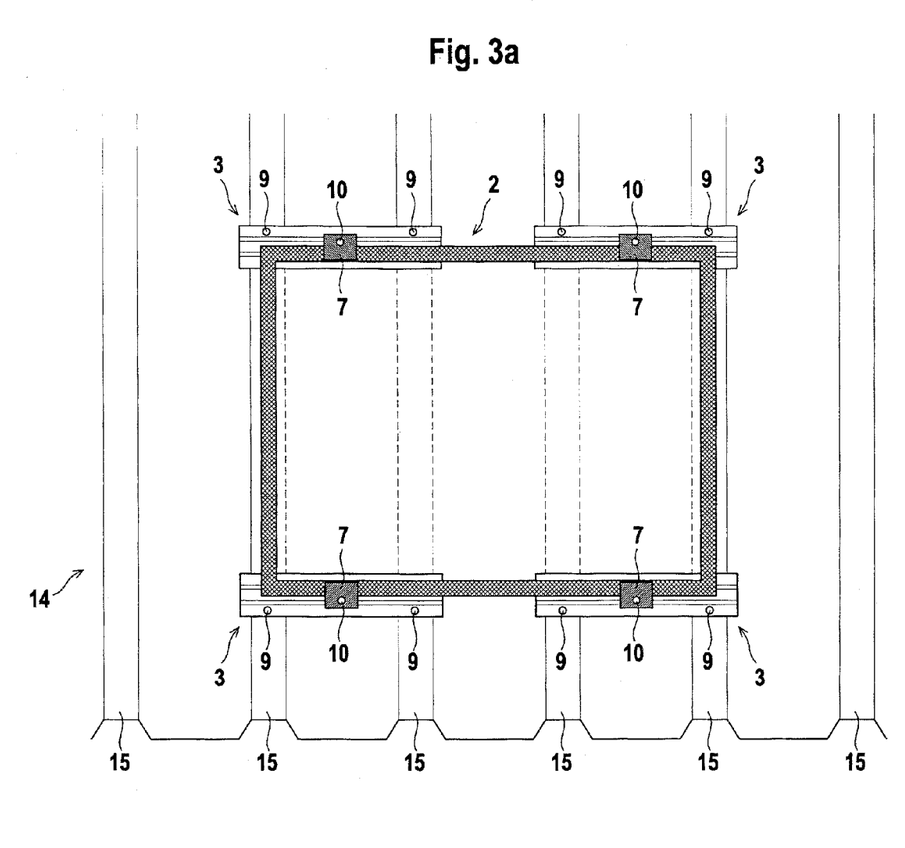
FIG. 3a: An arrangement of fastening modules as shown in FIGS. 1a-1c for a transverse mounting with respect to a pitch direction of a framed solar module on a trapezoid metal roof.
Figure 3B:
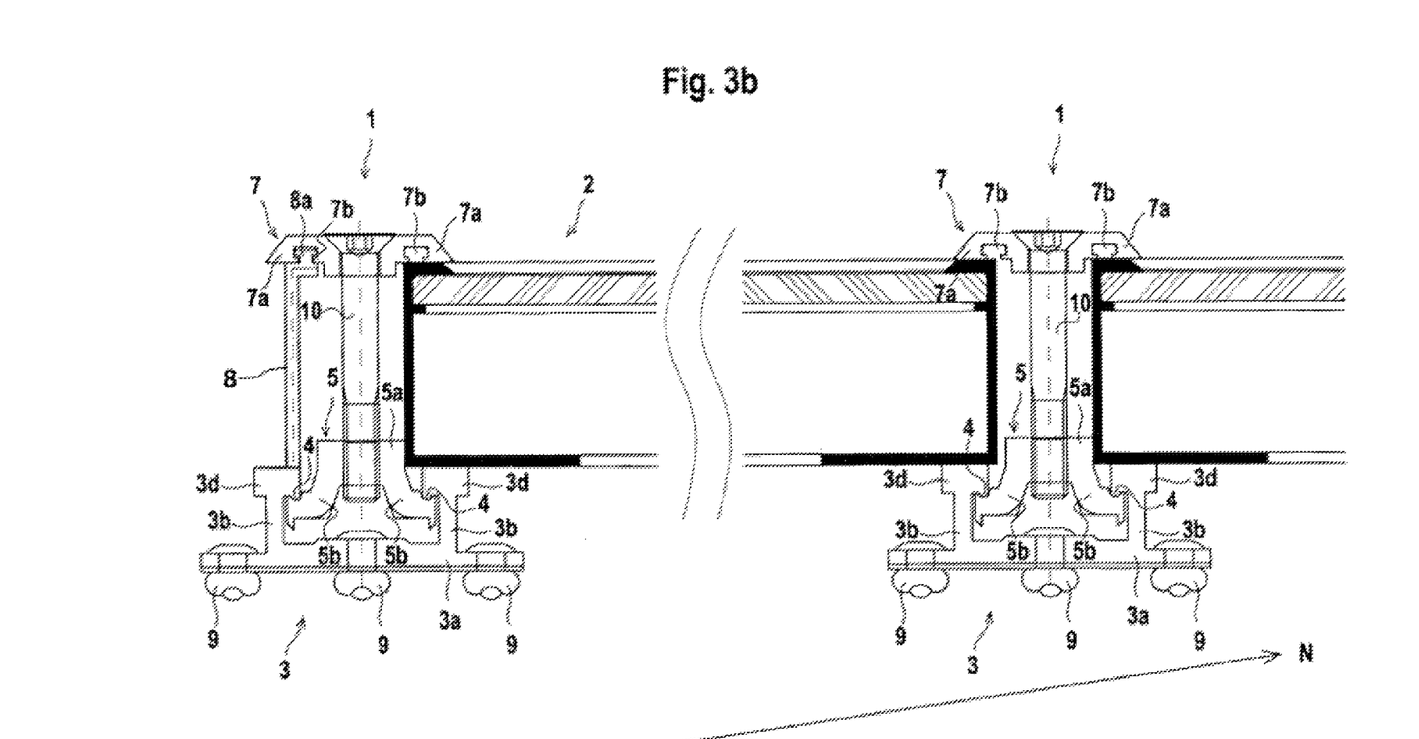
Figure 3C:
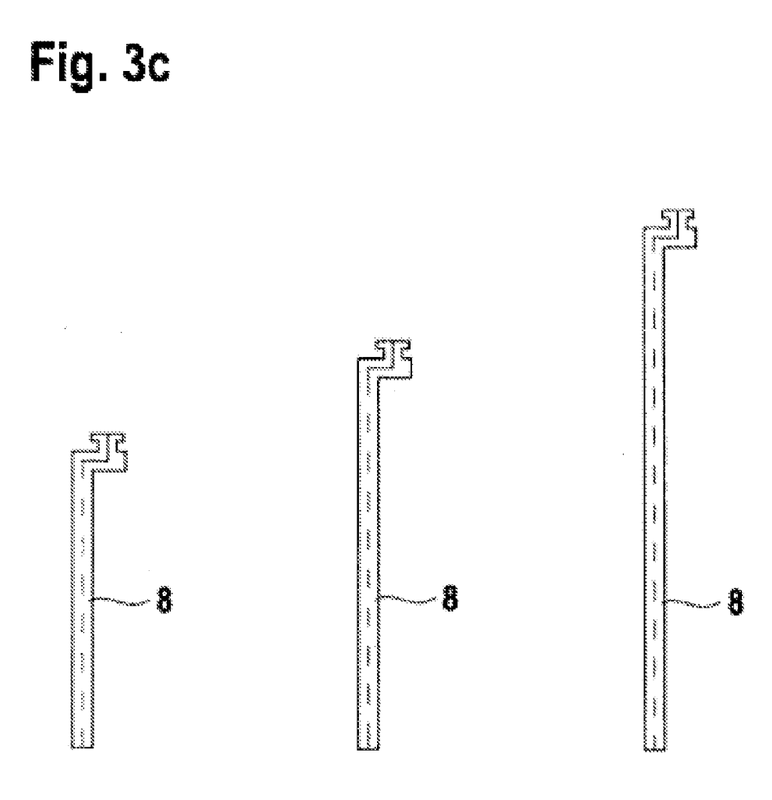
FIG. 3c shows side views of the spacer element of differing heights.
Figure 4A:
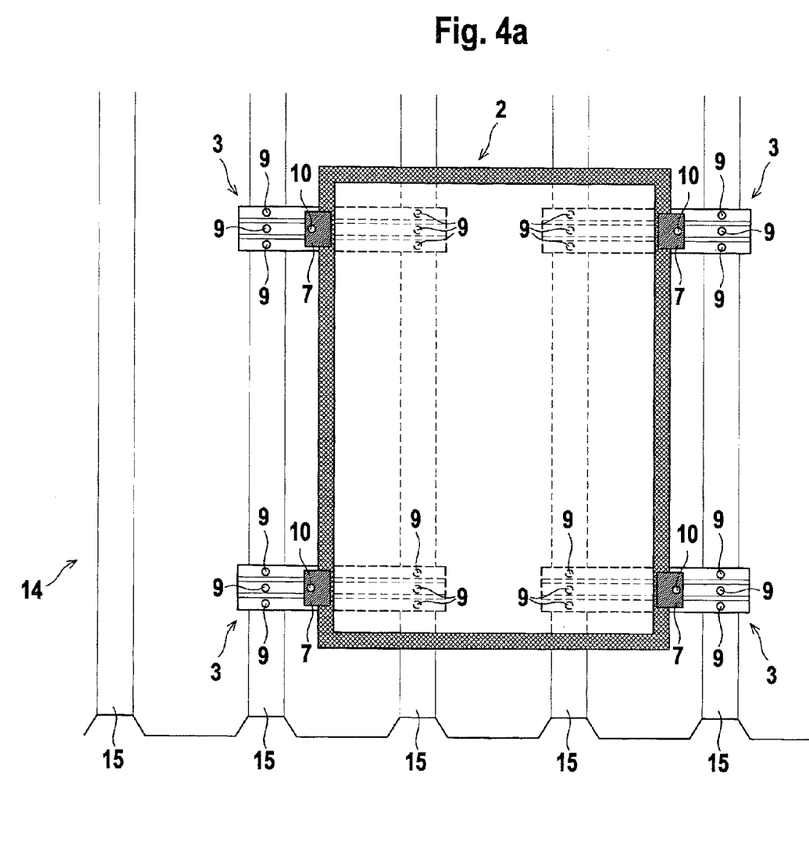
FIG. 4a: An arrangement of fastening modules according to FIGS. 1a-1c for the mounting of a framed solar module aligned with the pitch direction on a trapezoid metal roof.
Figure 4B:
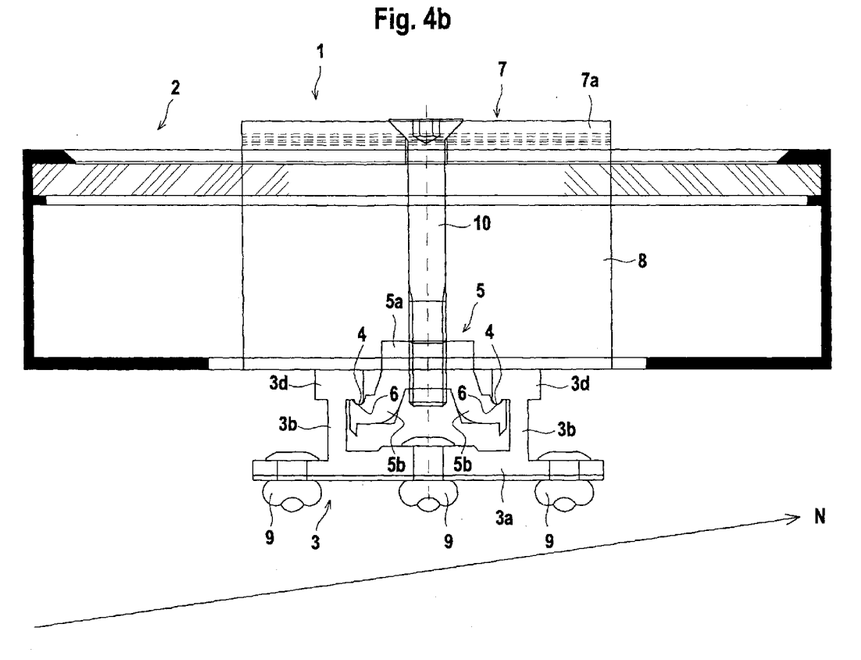

FIGS. 1a-1c show a first embodiment of the components of the fastening modules 1, used with a system for fastening solar modules 2, in particular photovoltaic modules on a trapezoid metal roof 14 with an arrangement of parallel-extending high beads 15, meaning a trapezoid metal roof structure. FIGS. 3 and 4 in this case show variants of a solar module 2 that is fastened with the aid of a fastening system formed with fastening modules 1.

The fastening system in this case consists solely of a plurality of such fastening modules 1, meaning no other elements are required for fastening the solar module 2 on the trapezoid metal roof 14.

A module carrier 3, shown in FIG. 1a, represents the first component of a fastening module 1, wherein FIG. 1a depicts a cross-sectional view of the module carrier 3. The module carrier 3 is embodied in the shape of a rail, wherein the cross section is constant over the complete length of the module carrier 3. The module carrier 3 is adapted to the structure of the trapezoid metal roof 14 which has an alternating sequence of high beads 15 and low beads, in a manner known per se, for which the longitudinal axes typically extend in the direction of inclination of the trapezoid metal roof 14. The length of the module carrier 3 is dimensioned such that when this carrier is mounted on the trapezoid metal roof 14, it rests transverse to its low beads precisely on two high beads 15, for example as shown in FIG. 3a.

The module carrier 3 comprises a bottom part 3a with therein provided three bores 3e. Fastening screws or the like can be inserted into these bores 3e in order to fasten the module carrier 3 on the trapezoid metal roof 14. To permit the fastening on two high beads 15 of a trapezoid metal roof 14, an additional row of three bores 3e is worked into the module carrier 3. Respectively one row of bores 3e thus serves for the fastening of the module carrier 3 on respectively one high bead. Two identically embodied side parts 3b project vertically upward from the bottom part 3a of the module carrier 3. The side parts 3b are embodied integrally with the bottom part 3a and extend at a distance parallel to each other. In the present case, the upper edges of the side parts are embodied as U-shaped profile sections 3c. A downward pointing projection 4 is provided on the inside, lower edge of each profile section 3c. The space between the two side parts 3b of the module carrier 3 forms a receptacle to accommodate a slide block 5, as shown in FIG. 1b, which represents another component of the fastening module 1.

The slide block 5 is positioned so as to be displaceable inside the receptacle and meets the function of a clamping device and spacer. The slide block 5 consists of a solid base body 5a, from which extensions 5b extend downward at an angle, symmetrical to its symmetry axes. Each top side of an extension 5b is provided with a groove 6 which, following the insertion of the slide block 5 into the module carrier 3, engages in a shoulder 4 of a profile sections 3c of the module carrier 3, thereby defining the position of the slide block 5 in the module carrier 3. The external side surfaces of the extensions 5b form sliding surfaces which allow the slide block 5 to fit against the inside surfaces of the side parts 3b of the module carrier 3, so as to be displaceable. The base body 5a, belonging to the slide block 5, projects over the top side of the module carrier 3.

An additional component of the fastening module 1 is the module clamp 7, illustrated in FIG. 1c. The module clamp 7 comprises two wing arms 7a, embodied symmetrical to the axis of symmetry for the module clamp 7, which make it possible to clamp in two adjacent solar modules 2. The module clamp 7 is connected to the slide block 5 via a fastening means that is not shown in FIG. 1c, meaning the slide block 5 meets the additional function of connecting the module clamps 7 to the module carrier 3.

Figure 2A:
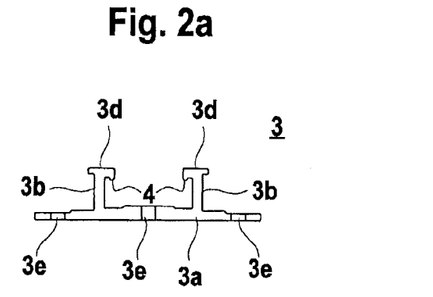
FIGS. 2a-2c: A variant of the components of a fastening module according to FIGS. 1a-1c.
Figure 2B:
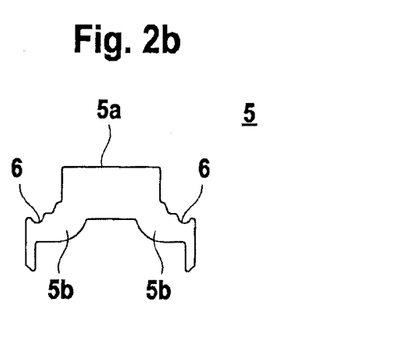
Figure 2C:
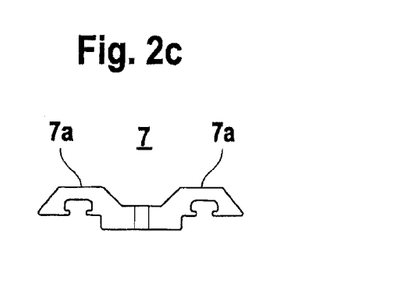

FIGS. 2a-2c illustrate a design variant of the components for the fastening module 1, shown in FIGS. 1a-1c. A comparison of these Figures shows that the embodiment of the module carrier 3 according to FIG. 2a essentially corresponds to the embodiment shown in FIG. 1a. The only difference is that in place of the profile sections 3c, plate-shaped projections 3d are provided at the upper ends of the side parts 3b, wherein the projections 4 are provided on the inside-positioned, lower edges. With the exception of slight geometric deviations, the slide block 5 according to FIG. 2b corresponds to the slide block 5 according to FIG. 1b. In the same way, the module clamp 7 according to FIG. 2c corresponds to the module clamp 7 shown with FIG. 1c.

FIGS. 3a, 3b show a first exemplary embodiment for the fastening system according to the invention, namely for the flat or transverse mounting of solar modules 2 on a trapezoid metal roof 14. FIG. 3a shows the mounting of a solar module 2 on the trapezoid metal roof 14. With this exemplary embodiment, the fastening system comprises the fastening modules 1 as shown in FIGS. 2a to 2c.

FIG. 3b shows two identically embodied solar modules 2 which are fastened with the fastening modules 1 of the fastening system on the trapezoid metal roof 14. In general, a larger number of solar modules 2 are fastened with the aid of the fastening modules 1 on the trapezoid metal roof 14. The solar modules 2 in the present case are embodied as framed solar modules 2. As a result of the framing, the fastening modules 1 do not come in direct contact with the limit surfaces of the solar modules 2 which are composed of glass laminate. The pitch or angle of inclination for the trapezoid metal roof 14 is indicated therein with an arrow given the reference N.

With the arrangement shown in FIG. 3b, the left fastening module 1 is arranged at the lower longitudinal side of the left solar module 2 while the right fastening module 1 is arranged at the upper longitudinal side of the left solar module 2 and, simultaneously, is connected to the lower longitudinal side of the adjacent right solar module 2.

As can be seen in FIG. 3a, all module carriers 3 for the fastening modules 1 rest on high beads 15 of the trapezoid metal roof 14 and are fastened with rivets 9 on these beads. The lengths of the module carriers 3 are dimensioned in such a way that these always rest precisely on two high beads 15. In place of rivet connections, screw connections can also be used for fastening the module carriers 3 on the trapezoid metal roof 14.

A slide block 5, which fits along the edge against the insides of the side parts 3b of the module carrier 3, is guided in the module carrier 3 of each fastening module 1. The shoulders 4 on the profile sections 3c of the side parts 3b for the module carrier 3 engage in the grooves 6 on the extensions 5b on the slide block 5, thereby fixing its orientation in the module carrier 3. The slide block 5 comprises a base body 5a which projects over the top side of the module carrier 3.

As can be seen in particular in FIG. 3b, a screw 10 is provided as means for connecting the module clamp 7 to the slide block 5 of a fastening module 1. The screw 10 extends through respectively one axial bore in the module clamp 7 and the slide block 5. Besides the bore, the slide block 5 is provided with a screw thread which accommodates the screw 10, thereby causing a clamping effect. The head of the screw 10 is exposed on the top of the module clamp 7, thus providing easy access for an operator.

A further component of a fastening module 1 is a plate-shaped spacer element 8 which functions as spacer between the module carrier 3 and the module clamp 7. This spacer element 8 comprises a flat bottom which rests on the flat top of the projection 3d on the module carrier 3. Provided at the upper edge of the spacer element 8 is a T-shaped guide element 8a which is inserted into a recess 7b on the wing arm 7a of the module carrier 3 and is guided therein. The contour of the recess 7b is adapted to the contour of the guide element 8a. By varying the height of the spacer elements 8, the fastening module 1 can be adapted to solar modules 2 with different structural heights, meaning thicknesses.

The fastening module 1 embodied in this way fixates the solar module 2 along its edge. For this, the module clamp 7 is fitted from the top onto the solar module 2, wherein the contact surface is formed by spacer elements 8. The lower edge of the solar module 2 rests on the projection 3d of the side part 3b of the module carrier 3. The side surface of the solar module 2 furthermore fits against the base body of the slide block 5 which projects over the module carrier 3. As a result, the slide block 5 of a fastening module 1 that is arranged at the lower edge of the solar module 2 functions as anti-slip device for the solar module 2.

FIGS. 4a, 4b show a second exemplary embodiment for the fastening system according to the invention, namely a vertical installation of a solar module 2. The solar module 2 shown in FIG. 4a corresponds precisely to the solar module 2 according to FIG. 3a. The components of the fastening module 1 of the fastening system are also identical to the arrangements shown in FIGS. 3a and 4a. In particular for the arrangements shown in FIGS. 3a and 4b, the module carriers 3 of the fastening modules 1 are mounted in the same way on the trapezoid metal roof 14, namely such that their longitudinal axes extend perpendicular to the high beads 15 of the trapezoid metal roof 14, wherein each module carrier 3 rests on two high beads 15.

In order to change from a transverse mounting of the solar module 2, as shown in FIG. 3a, to mounting aligned with the pitch direction, as shown in FIG. 4a, it is only necessary to displace the slide blocks 5 inside the module carriers 3 to adjust the spacing to match the narrow side of the solar module. In addition, the module clamps 7 and the spacer elements 8 are rotated relative to the screw 10 by 90°, as compared to the orientation for the transverse mounting, so that the module clamps 7 with the spacer elements 8 now fit against the side of the solar module 2, as shown in FIG. 4a.

As a result of the 90° rotation, the longitudinal axes of the module clamps 7 and the spacer elements 8 no longer extend parallel to the longitudinal axes of the respective module carriers 3, but are arranged perpendicular thereto, as shown in FIGS. 4a and 4b.

As can be seen in particular in FIG. 4b, the underside of the spacer element 8 now rests on the top sides of both projections 3d of the module carrier 3. The solar module 2 is secured in that it rests with its underside on the projections 3d of the module carrier 3. One wing arm 7a of the module clamp 7 rests on the top of the solar module 2. By tightening the screw 10, the solar module 2 is clamped in and secured in place between the projections 3d of the module carrier 3 and the module clamp 7.

Since the fastening modules 1 for the mounting aligned with the pitch direction as shown in FIGS. 4a, 4b rest against the side of the solar module 2, these fastening modules 1 do not function as anti-slip protection for the solar module 2.

Figure 5:
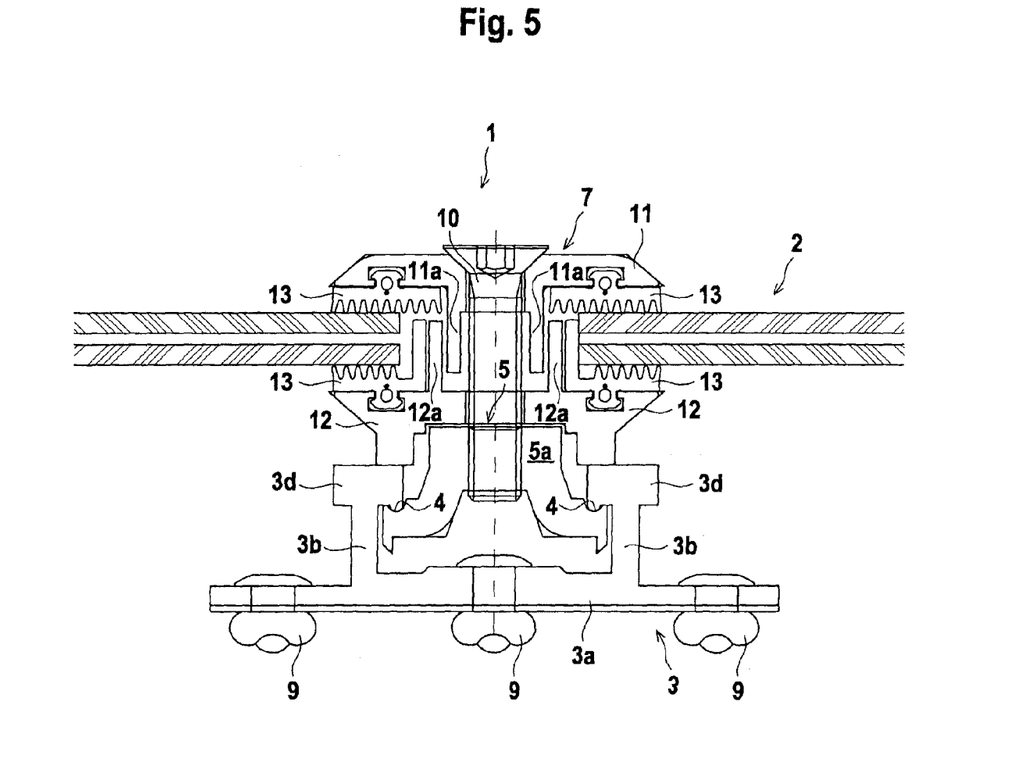
FIG. 5: An embodiment of a fastening module for mounting non-framed solar modules on a trapezoid metal roof.

FIG. 5 shows an embodiment of a fastening module 1 of the fastening system according to the invention which is used to mount a non-framed solar module 2 on a trapezoid metal roof 14, meaning components of the fastening module 1 in that case come in direct contact with the limit surfaces of the solar module 2, which are composed of glass laminate. Coinciding with the arrangement shown in FIGS. 3 and 4, the fastening module 1 according to FIG. 4 is also provided with a module carrier 3, a slide block 5, a module clamp 7, fastening rivets 9 for mounting the module carrier 3 on the trapezoid metal roof 14, and a screw 10 for connecting the slide block 5 to the module clamp 7. The module carrier 3 and the slide block 5 correspond precisely to the embodiment shown in FIGS. 2a and 2b.

In contrast thereto, the module clamp 7 for the example shown in FIG. 5 consists of two parts, namely an upper part 11 and a lower part 12. The upper and lower parts 11, 12 are respectively provided with two wing sections, analogous to the module clamp 7 shown in FIG. 1c, so that a fastening module 1 can be mounted on two solar modules 2. The upper part 11 and the lower part 12 initially rest loosely one on top of the other. Both elements are provided with a bore through which the screw 10 extends which engages in the bore with thread in the slide block 5. The clamping together of the upper part 11 and the lower part 12 is achieved by screwing the screw 10 into the screw thread of the slide block 5.

Elastic elements in the form of ethylene propylene diene monomer (EPDM) seals 13 are respectively arranged on the limit surfaces for the upper and lower part 11, 12, which face the solar module 2. When tightening the screw 10, the EPDM seals 13 are pressed against the top and bottom side of the solar module 2, composed of glass laminate, thereby securing the solar module 2 in its position. The elastic characteristics of the EPDM seals 13 prevent damage to the solar modules 2 when these are secured with the aid of the fastening modules 1.

For a transverse mounting as shown in FIG. 5, perpendicular webs 11a, 12a on the upper and lower parts 11, 12 of the module clamp 7 function as anti-slip protection for the solar module 2 since, in that case, the fastening module 1 fits against the underside of the solar module 2. These perpendicular webs 11a, 12a are coated with EPDM, so that the glass laminate of the solar module 2 is not damaged.

By displacing the slide block 5 inside the module carrier 3 and subsequently rotating the module clamps 7 by 90°, it is possible to realize a mounting of a solar module 2 aligned with the pitch direction, analogous to the embodiment shown in FIGS. 4a, 4b, wherein the fastening modules 1 which are used for this mounting again fit against the side of the solar module 2.

The invention claimed is:

1. A fastening system including a plurality of fastening modules to mount a framed solar module having a first longitudinal direction on a roof structure or a façade, the roof structure or façade each having a second longitudinal direction, wherein each fastening module comprises:
   one module carrier mountable on the roof structure or on the façade;
   a slide block guidable inside the module carrier and comprising a base body having a region extending above the module carrier and presenting a side surface;
   a module clamp; and
   a fastener to connect the module clamp to the slide block to clamp the framed solar module between the module clamp and the slide block;
   wherein the module clamp is rotatable between two positions on the fastener so that an arrangement of the fastening modules permits the framed solar module to be mounted on the roof structure or the façade with the first longitudinal direction of the framed solar module being perpendicular or parallel to the second longitudinal direction of the roof structure or facade, and wherein when the framed solar module is mounted with the first longitudinal direction of the framed solar module perpendicular to the second longitudinal direction of the roof structure or facade, the slide block is arranged at a lower edge of the framed solar module and the side surface of the slide block contacts a side edge of the framed solar module to form an anti-slip protection with the slide block and the framed solar module.

2. The fastening system according to claim 1, wherein each fastening module further comprises a spacer element rotatable along with the module.

3. The fastening system according to claim 2, wherein each fastening module comprises spacer elements of different heights or thicknesses to permit mounting of solar modules of different structural height.

4. The fastening system according to claim 1, wherein the roof structure or façade has a pitch and the second longitudinal direction is in a direction of the pitch, and the fastening modules are arrangeable on a lower and upper edge of the solar module when the solar module is to be mounted with the first longitudinal direction perpendicular to the second longitudinal direction of the roof structure or facade.

5. The fastening system according to claim 1, wherein the roof structure or façade has a pitch and the second longitudinal direction is in a direction of the pitch, and the fastening modules are arrangeable on side edges of the solar module when the solar module is to be mounted with the first longitudinal direction parallel to second longitudinal direction.

6. The fastening system according to claim 1, wherein the module clamp and spacer element are rotatable by 90° between the two positions.

7. The fastening system according to claim 1, wherein the roof structure comprises a trapezoid metal roof having at least two successively following high beads, and each module carrier is mountable on two successively following high beads.

8. The fastening system according to claim 1, wherein each module carrier comprises a rail-type holding fixture in which the slide block is positioned displaceable.

9. The fastening system according to claim 1, wherein the fastener comprises a screw to connect the module clamp to the slide block.

10. The fastening system according to claim 1, wherein the solar module is mountable on the roof structure or on the facade, and the module clamp of the fastening module fits only against a top of the solar module and the underside of the solar module rests on a support surface of the respective module carrier.

* * * * *